United States Patent [19]

Wolf et al.

[11] Patent Number: 4,833,176

[45] Date of Patent: May 23, 1989

[54] PROCESS FOR THE PREPARATION OF COLD SETTING FLEXIBLE POLYURETHANE MOLDED FOAMS

[75] Inventors: Klaus-Dieter Wolf; Hans-Joachim Kogelnik, both of Cologne, Fed. Rep. of Germany

[73] Assignee: Bayer Aktiengesellschaft, Bayerwerk, Fed. Rep. of Germany

[21] Appl. No.: 205,988

[22] Filed: Jun. 13, 1988

[30] Foreign Application Priority Data

Jun. 26, 1987 [DE] Fed. Rep. of Germany ....... 3721058

[51] Int. Cl.⁴ .............................................. C08G 18/14
[52] U.S. Cl. ..................................................... 521/160
[58] Field of Search ......................................... 521/160

[56] References Cited

U.S. PATENT DOCUMENTS 3,706,678 12/1972 Dietrich et al. ...................... 260/2.5
4,248,930 2/1981 Haas et al. .......................... 428/315
4,263,408 4/1981 Meyborg et al. ..................... 521/51

FOREIGN PATENT DOCUMENTS 2948289 6/1981 Fed. Rep. of Germany .
892776 3/1962 United Kingdom .
1133691 11/1968 United Kingdom .

OTHER PUBLICATIONS

Journal of Cellular Plastics, 20, 1984 by S. Consoli et al., pp. 200–204.

Primary Examiner—Maurice J. Welsh
Attorney, Agent, or Firm—Gene Harsh; Joseph C. Gil; Thomas W. Roy

[57] ABSTRACT

The present invention is directed to a process for the preparation of cold setting, flexible, polyurethane, molded foams in a closed mold by reacting a polyisocyanate with a high molecular weight polyol in the presence of about 5 to 15, preferably about 6 to 12 parts by weight of water, based on the weight of the high molecular weight polyol at an isocyanate index below 70.

4 Claims, No Drawings

PROCESS FOR THE PREPARATION OF COLD SETTING FLEXIBLE POLYURETHANE MOLDED FOAMS

BACKGROUND OF THE INVENTION

1, Field of the Invention

The present invention is directed to a process for the production of cold setting, flexible polyurethane molded foams using increased amounts of water at an isocyante index of less than 70.

2. Description of the Prior Art

Cold setting, flexible, polyurethane molded foams are widely used inter alia, in the motor vehicle industry and the furniture industry. The quality of the flexible, polyurethane molded foams conventionally used for upholstering seats and arm rests depends for the most part on their gross density. Regardless of the nature of the basic raw materials (polyols/isocyanates) used for the preparation of the cold setting molded foams, it has been found advisable and practical for certain uses and the attendant requirements, especially with regard to the long term durability in use, to ensure that the foams reach a certain level of gross density.

The gross density obtained is mainly determined by the water content in the combination of raw materials. Typical water contents are up to 5 parts by weight (generally 2.5 to 3.5 parts by weight) per 100 parts of polyol, depending on the particular level of gross density required.

It has been shown that the lower gross densities frequently required for the purpose of reducing weight and cost (although this depends on the particular purpose for which the foam is to be used) can only in exceptional cases be achieved by increasing the water content above the aforesaid quantities. The reason for this lies in the fact that as the proportion of water increases (above 3.5 parts by weight per 100 parts by weight of polyol), the catalytic adjustment of the chemical reaction (polymer formation/gas formation) which is essential for the foaming process becomes more difficult and the latitude allowable for the process is greatly restricted. Apart from problems relating to the nature of the skin (mold temperature/mold release agent) and the stability of the foam, the range of isocyanate indexes allowable is also restricted. For these reasons, any desired or necessary lowering of the gross density is preferably brought about by the addition of physical blowing agents (e.g. halogenated hydrocarbons). This method is state of the art and is in principle applicable to all cold setting molded foams.

When pure MDI is used and especially also when MDI prepolymers are used, the quantity of $CO_2$ evolved (per unit quantity of water) must be capable of foaming up a larger quantity of raw material than in the case of TDI (NCO=48.3%) owing to the comparatively low NCO content of MDI (about 32% or about 25% or less). Therefore, it has frequently been necessary to add alternative blowing agents in order to obtain at least a reasonably satisfactory level of gross density for the given use or purpose. This procedure, however, cannot be recommended in view of the environmental pollution and the high cost.

In order that the conventional ranges of gross density of PUR foams may be further reduced when pure TDI, TDI mixtures or corresponding prepolymers are used, it has previously also been necessary to use additional, alternative blowing agents as in the case of MDI. This method is also inadvisable for reasons of environmental protection.

It has now surprisingly been found that atypically high quantities of water of more than 5.0 parts by weight per 100 parts by weight of "basic polyol" can easily be worked up and consequently gross densities as low as 15 kg/m³ may be obtained in cold setting, flexible, polyurethane molded foams if instead of employing an isocyanate index within the conventional range (80 to 120), a prohibitively low isocyanate index of less than 70 is used for foaming.

It is known from GB-PS 892,776 that rigid or semi-rigid polymer foams may be prepared by the reaction of 100 parts by weight of a monomeric organic polyisocyanate with about 1 to 30 parts by weight of water in the presence of a surface active agent and a catalyst, preferably in the presence of 5 to 30 parts by weight of a polyfunctional compound containing two or more than two isocyanate reactive groups. However, it is clear from the claims and from the examples of the British patent that the "catalysts" used therein are inorganic catalysts such as potassium acetate or sodium hydroxide so that the foaming process is dominated by trimerization reactions such that the low isocyanate indexes according to the present invention are not used.

The PUR flexible molded foams to be produced according to the present invention also differ from the rigid and semi-rigid foams obtained according to GB-PS 892,776 in that they have different molding characteristics. It is apparent, for example, from the measurements of rigidity obtainable from the deformation diagrams that the PUR flexible, molded foams produced according to the present invention have a higher elasticity (= capacity for more rapid restoration after subjection to a load) and a lower level of rigidity. Both of these features are advantageous for the particular requirements of these products in practical use. A characteristic magnitude expressing this feature is the relative energy absorption after 70% compression = H 70 (see tables on pages 17 and 18).

It is further known from GB-PS 1,133,691 that flexible polyurethane foams can be obtained by the reaction of polyisocyanates such as diphenylmethane diisocyanate with higher molecular weight polyols in the presence of 1.5 to 5.0 parts by weight of water based on 100 parts by weight of the high molecular weight polyol. The preparation of these foams is carried out in open molds. However, it was found that the application of such higher amounts of water as blowing agent in the preparation of these foams in open molds often led to a self-ignition of the foam during storage. Also, these foams were often scorched. It was therefore unexpected that these disadvantages could be avoided in the preparation of the foam in closed molds if even higher amounts of water were applied as blowing agent.

SUMMARY OF THE INVENTION

The present invention is directed to a process for the preparation of cold setting, flexible polyurethane, molded foams by the reaction of
 (a) polyisocyanates
 (b) with compounds in the molecular weight range of 400 to about 10,000 containing at
 (c) least two isocyanate reactive groups, water as blowing agent,
 (d) optionally chain lengthening agents and crosslinking agents containing at least two isocyanate reactive groups and having a molecular weight of 32 to 399 and (e) optionally in the presence of other blowing agents and/or catalysts inside a closed mold, characterized in that 1. the polyisocyanates (a) are selected from diphenylmethane diisocyanate, toluylene diisocyanate, hexamethylene diisocyanate and/or isophorone diisocyanate, 2. water is used as blowing agent (d) in a quantity of about 5 to 15 parts by weight, preferably about 6 to 12 parts by weight, based on 100 parts by weight of component (b) and 3. the reaction of all the components is carried out at an isocyanate index below 70, preferably about 40 to 60.

DETAILED DESCRIPTION OF THE INVENTION

Suitable starting components for use according to the invention for the preparation of the flexible polyurethane molded foams include:

1. Polyisocyanates such as 2,4- and/or 2,6-toluylene diisocyanate ("TDI"), 4,4'- and/or 2,4'-diphenylmethane diisocyanate (MDI), hexamethylene diisocyanate, isophorone diisocyanate, polyphenyl-polymethylene polyisocyanates which may be prepared by aniline-formaldehyde condensation followed by phosgenation ("crude MDI"), polyisocyanates derived from, 2,4- and/or 2,6-toluylene diisocyanate, 4,4'- and/or 2,4'-diphenylmethane diisocyanate, hexamethylene diisocyanate and/or isophorone diisocyanate and having carbodiimide groups, urethane groups, allophanate groups, isocyanurate groups, urea groups or biuret groups, and alkyl-substituted derivatives of MDI as described, for example, in DE-OS 2,935,318, DE-OS 3,032,128 and DE-OS 3,032,358.

The polyisocyanates preferably used according to the invention include the following types of MDI:

(a) Mixtures of diphenylmethane diisocyanates with polyphenyl-polymethylene polyisocyanates wherein the portion of polyphenyl-polymethylene polyisocyanate is 0 to about 40% by weight and the portion of diphenylmethane diisocyanate isomers is about 60 to 100% by weight.

(b) Urethane-modified aromatic di- and/or polyisocyanates having an isocyanate content of about 15 to 30% by weight and obtained by the reaction of a mixture as described under (a) of diphenylmethane diisocyanates and polyphenyl-polymethylene polyisocyanates with a hydroxyl compound or optionally several hydroxyl compounds having a functionality of 2 to 6.

(c) Mixtures of the MDI products described under (a) and/or (b) with a maximum of 25% by weight of aliphatic, cycloaliphatic, heterocyclic or other types of aromatic polyisocyanates such as those described by W. Siefken in Justus Liebigs Annalen der Chemie, 562, pages 75 to 136.

The following types of TDI are also preferably used according to this invention:

toluylene diisocyanate in the form of a mixture of 2,4- and 2,6-isomers in a ratio of 80:20 (TDI 80), toluylene diisocyanate in the form of a mixture of 2,4- and 2,6-isomers in a ratio of 65:35 (TDI 65), toluylene diisocyanate prepolymers and mixtures of TDI with diphenylmethane diisocyanate and/or polyphenyl-polymethylene polyisocyanates.

2. Compounds containing at least two isocyanate reactive groups and generally having a molecular weight of 400 to about 10,000. These include not only compounds containing amino groups, thiol groups or carboxyl groups, but particularly compounds containing hydroxyl groups, in particular compounds containing 2 to 8 isocyanate reactive groups, especially those with molecular weights of about 1,000 to 6,000, preferably about 2,000 to 6,000. Examples include polyethers, polyesters, polycarbonates and polyester amides containing at least 2, preferably 2 to 8 and more preferably 2 to 6 hydroxyl groups, such as the compounds known for the production of both homogeneous and cellular polyurethanes and described in DE-OS 2,832,253, pages 11 to 18 (U.S. Pat. No. 4,263,408, herein incorporated by reference in its entirety). These compounds preferably have an OH number of about 28 to 56.

3. Compounds with molecular weights of 32 to 399 containing at least two isocyanate reactive groups may optionally be used. These again are compounds containing hydroxyl groups, amino groups, thiol groups and/or carboxyl groups, preferably hydroxyl groups and/or amino groups, and serve as chain lengthening agents or cross-linking agents. These compounds generally contain 2 to 8, preferably 2 to 4 isocyanate reactive groups. Examples include those described in DE-OS 2,832,253, pages 10 to 20 (U.S. Pat. No. 4,263,408, previously incorporated by reference).

4. Water as blowing agent in a quantity of about 5 to 15 parts by weight, preferably about 6 to 12 parts by weight, per 100 parts by weight of component b).

5. Auxiliary agents and additives may optionally be used such as (a) readily volatile organic substances present as additional blowing agents, (b) known reaction accelerators and reaction retarders, (c) surface active additives such as emulsifiers and foam stabilizers, as well as cell regulators such as paraffins, fatty alcohols, dimethylpolysiloxanes, pigments, dyes and flame retardants, (such as trischloroethylphosphate and tricresylphosphate), stabilizers against aging and weathering, plasticizers, fungistatic and bacteria static substances and fillers (such as barium sulphate, kieselguhr, carbon black or whiting).

These auxiliary agents and additives optionally used are described, for example, in DE-OS 2,732,292, pages 21 to 24 (U.S. Pat. No. 4,248,930, herein incorporated by reference in its entirety).

Other examples of surface active additives and foam stabilizers optionally used according to the invention as well as cell regulators, reaction retarders, stabilizers, flame retarding substances, plasticizers, dyes and fillers and fungistatic and bacteria static substances and details concerning the use and mode of action of these additives are described in Kunststoff Handbuch, volume VII, published by Vieweg and Hochtlen, Carl-Hanser-Verlag, Munich 1966, e.g. on pages 103 to 113.

According to this invention, the reactants are reacted together by the known one shot process, the prepolymer process or the semi-prepolymer process, in many cases using mechanical devices such as those described, for example, in U.S. Pat. No. 2,764,565. Details concerning the processing apparatus which may be used according to this invention are given in Kunststoff Handbuch, volume VII, published by Vieweg and Hochtlen, Carl-Hanser-Verlag, Munich 1966, e.g. on pages 121 to 205.

The reaction of all the components is carried out according to the invention at an index below 70, preferably an index of about 40 to 60.

The index, a concept frequently used in the production of polyurethane foams, is an indication of the degree of cross-linking of a foam. It is customary to define a foam as having been manufactured with an index of 100 if the number of isocyanate groups corresponds to the number of isocyanate reactive groups. The index is therefore a means of defining more accurately the degree of under or over cross-linking. The index is calculated from the following general formula:

$$\text{index} = \frac{\text{number of isocyanate groups} \times 100}{\text{number of isocyanate reactive groups}}$$

According to the invention, foaming is carried out in closed molds. The reaction mixture is introduced into a mold which may be made of metal, e.g. aluminum, or a plastic, e.g. an epoxide resin. The foamable reaction mixture foams up inside the mold to give rise to the molded object. According to the present invention, the quantity of foamable reaction mixture introduced into the mold may either be just sufficient to fill the mold with foam or a larger quantity of reaction mixture may be introduced, this variation being known as overcharging. A procedure of this kind has been disclosed, for example, in U.S. Pats. Nos. 3,178,490 and 3,182,104.

The flexible, polyurethane molded foams obtained according to the invention may be used, for example, for dashboards, arm rests (also in passenger cars), beds and seating furniture, head rests and seats in public transport vehicles, preferably in motor cars.

The invention is further illustrated but is not intended to be limited by the following examples in which all parts and percentages are by weight unless otherwise specified.

EXAMPLES

The preparation of the flexible molded foams according to the invention was carried out by vigorously mixing the components of the formulation given below and introducing the resulting reactive mixture into molds which were closed on all sides. In this process, all of the individual raw materials with the exclusion of the polyisocyanate were subjected to preliminary mixing to produce a mixture (component B) which was subsequently reacted with the polyisocyanate (component A). The quantities shown in the tables are parts by weight.

Polyether A: a trifunctional, long chain propylene oxide (PO)/ethylene oxide (EO) polyether (about 21% EO tipped, OH number =28)
Polyether B: a difunctional, long chain PO/EO polyether (about 30% EO tipped, OH number =28)
Polyether C: a 6-functional, long chain PO/EO polyether (about 18% EO tipped, OH number =28)
Polyether D: a trifunctional, short chain EO polyether (100% EO, OH number =550)
Polyether E: a trifunctional, long chain PO/EO polyether (about 13% EO tipped, OH number =28)
Polyether F: a trifunctional, long chain PO/EO polyether (about 18% EO tipped, OH number =35) containing about 20% of organic filler (polyhydrazodicarbonamide)
Polyether G: a trifunctional, long chain PO/EO polyether (about 5% EO tipped, OH number =56)
Polyether H: a trifunctional, long chain polyether, containing a PO block, a EO/PO random block and a terminal EO block (about 10% EO tipped, OH number =36)
Polyether I: a 6-functional, long chain PO/EO polyether (about 82% EO tipped, OH number =100)
Catalyst 1: triethylenediamine/33% in dipropyleneglycol
Catalyst 2: N,N-bis-(3-dimethylamino-n-propyl) formamide
Catalyst 3: N,N-bis-(3-dimethylamino-n-propyl)-methyl-amine
Catalyst 4: dibutyl tin dilaurate
Catalyst 5: dimethylaminopropylamine
Stabilizer KS 43: a product of Bayer AG (mixture of low molecular weight siloxanes)
Tegostab B 4690: a product of TH. Goldschmidt AG
Tegostab B 4900: a product of TH. Goldschmidt AG
Tegostab B 8002: a product of TH. Goldschmidt AG
Isocyanate S: a mixture of 80% TDI 80 and 20% crude MDI 55/2 *
Isocyanate T: a mixture of 80% TDI 65 and 20% crude MDI 55/2 *
Isocyanate U: a mixture of 70% TDI 65 and 30% crude MDI 55/2 *
Isocyanate V: a prepolymer based on 52 parts TDI 65 and 10 parts polyether C (NCO =40.5%)
Isocyanate W: a prepolymer based on 52 parts TDI 80 and 10 parts polyether C (NCO =40.5%)
Isocyanate X: a prepolymer which is based on 38 parts of a mixture of 60 parts MDI 85/20* and 40 parts polyether B (NCO =18.5%) and 62 parts MDI 82/34* (NCO =27.1%)
Isocyanate Y: a prepolymer based on 80 parts MDI 84/24* and 20 parts polyether E (NCO =25.4%)
Isocyanate Z: a mixture of 80 parts MDI 82/24* and 20 parts TDI 80 (NCO =35.5%)

* In this typical description of MDI products, the first number denotes the dinuclear content and the second number denotes the proportion of 2,4-isomer.

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Polyether E | 100 | 100 | 100 | 100 | 97 | 100 | 25 | — | — | — | — | — | — |
| Polyether F | — | — | — | — | — | — | 75 | — | — | — | 10 | — | — |
| Polyether A | — | — | — | — | — | — | — | 95 | — | — | — | — | — |
| Polyether B | — | — | — | — | — | — | — | — | 70 | — | — | — | — |
| Polyether C | — | — | — | — | — | — | — | — | — | 85.5 | 75 | 85 | 100 |
| Polyether D | — | — | — | — | 2.0 | — | — | — | — | — | — | — | — |
| Polyether G | — | — | — | — | — | — | — | — | 30 | 9.5 | — | — | — |
| Polyether H | — | 2.0 | — | — | — | 2.0 | — | — | 5.0 | 15 | 15 | — | — |
| Water | 10 | 10 | 10 | 10 | 10 | 7.5 | 10 | 10 | 10 | 10 | 10 | 10 | 10 |
| Catalyst 1 | 0.2 | 0.2 | 0.2 | — | 0.5 | 0.2 | — | 0.5 | — | 0.7 | 0.5 | 0.7 | 0.3 |
| Catalyst 2 | 0.5 | — | 0.2 | — | — | 0.2 | — | — | — | — | — | — | — |
| Catalyst 3 | 0.5 | — | — | 0.5 | — | — | 0.5 | — | 0.5 | 0.3 | 0.1 | 0.3 | — |
| Triethylamine | — | — | — | 1.0 | 0.5 | — | 1.0 | 0.5 | 1.0 | 1.0 | 1.0 | 1.0 | 0.5 |

-continued

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Diethanolamine | 1.0 | 1.0 | 2.0 | — | — | 1.5 | — | — | — | — | — | — | — |
| Polyether I | — | — | — | 3.0 | 1.0 | — | 3.0 | 5.0 | — | — | — | — | — |
| Catalyst 4 | 0.2 | 0.1 | 0.1 | — | — | 0.1 | — | — | — | — | — | — | — |
| Stabilizer KS 43 | 1.0 | 1.0 | 1.0 | — | — | 1.0 | — | — | — | 1.0 | — | 1.0 | 0.5 |
| Tegostab B 8002 | — | — | — | — | — | — | — | — | 0.6 | — | 0.1 | — | — |
| ε-caprolactam | — | — | 10 | — | — | 7.5 | — | — | — | — | — | — | — |
| MDI 100/52* | + | — | — | — | — | — | — | — | — | — | — | — | — |
| MDI 81/22 | — | + | — | — | — | — | — | — | — | — | — | — | — |
| MDI 84/24 | — | — | + | — | — | + | — | — | — | — | — | — | — |
| MDI 82/34 | — | — | — | + | — | — | + | — | — | — | — | — | — |
| MDI 85/27 | — | — | — | — | + | — | — | — | — | — | — | — | — |
| Isocyanate X | — | — | — | — | — | — | — | + | — | — | — | — | — |
| Isocyanate Y | — | — | — | — | — | — | — | — | + | — | — | — | — |
| MDI 88/28 | — | — | — | — | — | — | — | — | — | + | + | — | + |
| Isocyanate Z | — | — | — | — | — | — | — | — | — | — | — | + | — |
| MDI 100/52* | + | — | — | — | — | — | — | — | — | — | — | — | — |
| MDI 81/22 | — | + | — | — | — | — | — | — | — | — | — | — | — |
| MDI 84/24 | — | — | + | — | — | + | — | — | — | — | — | — | — |
| MDI 82/34 | — | — | — | + | — | — | + | — | — | — | — | — | — |
| MDI 85/27 | — | — | — | — | + | — | — | — | — | — | — | — | — |
| Isocyanate X | — | — | — | — | — | — | — | + | — | — | — | — | — |
| Isocyanate Y | — | — | — | — | — | — | — | — | + | — | — | — | — |
| MDI 88/28 | — | — | — | — | — | — | — | — | — | + | + | — | + |
| Isocyanate Z | — | — | — | — | — | — | — | — | — | — | — | + | — |
| Index | 50 | 50 | 50 | 60 | 44 | 50 | 40 | 36 | 50 | 50 | 50 | 50 | 42 |
| Gross density (kg/m$^3$) | 27/28 | 26/26 | 26/26 | 25/25 | 34/34 | 29/29 | 30/29 | 32/33 | 32/32 | 32/32 | 31/31 | 30/30 | 28/29 |
| H 70 (%) | 44.5 | 39.6 | 39.8 | 41.8 | 41.9 | 31.2 | 44.7 | 38.6 | 43.0 | 36.8 | 32.6 | 29.0 | 41.7 |

*In this typical description of MDI products, the first number denotes the dinuclear content and the second number denotes the proportion of 2,4-isomer.

| | Examples | | | | | | | | | | | | | |
|---|---|---|---|---|---|---|---|---|---|---|---|---|---|---|
| | 14 | 15 | 16 | 17 | 18 | 19 | 20 | 21 | 22 | 23 | 24 | 25 | 26 | 27 |
| Polyether A | — | — | 10 | — | — | 30 | — | — | — | — | — | — | — | — |
| Polyether C | 90 | 98 | 40 | 70 | 90 | 70 | 90 | 70 | 98 | 98 | 98 | 90 | 90 | 80 |
| Polyether F | 10 | — | 48 | 28 | 10 | — | 10 | 30 | — | — | — | — | — | 18 |
| Polyether H | — | 2 | 2 | 2 | — | — | — | — | 2 | 2 | 2 | — | — | 2 |
| Water | 10 | 10 | 10 | 10 | 10 | 10 | 10 | 10 | 10 | 10 | 10 | 10 | 10 | 10 |
| Catalyst 1 | 0.5 | 0.66 | 0.5 | 0.5 | 0.5 | 0.5 | 0.5 | 0.5 | 0.5 | 0.5 | 0.5 | 0.5 | 0.5 | 0.5 |
| Catalyst 3 | 0.1 | 0.1 | 0.1 | 0.1 | 0.1 | 0.1 | 0.1 | 0.1 | 0.1 | 0.1 | 0.1 | 0.1 | 0.1 | 0.1 |
| Catalyst 5 | — | 0.35 | — | — | — | — | — | — | — | — | — | — | — | — |
| Diethanolamine | — | — | — | — | — | — | — | 1.5 | — | — | — | — | — | — |
| Triethanolamine | 0.5 | 0.25 | 0.5 | 0.5 | 0.5 | 0.5 | 0.5 | 0.5 | 0.5 | 0.5 | 0.5 | 0.5 | 0.5 | 0.5 |
| Stabilizer KS 43 | 1.0 | — | — | — | — | — | — | — | 0.5 | 0.5 | 0.5 | 0.5 | 1.0 | — |
| Tegostab B 4690 | — | 2.0 | 2.0 | 2.0 | 2.0 | 2.0 | 2.0 | 2.0 | — | — | — | — | — | — |
| Tegostab B 4900 | 0.1 | — | — | — | — | — | — | — | — | — | — | — | — | — |
| Tegostab B 8002 | — | — | — | — | — | — | — | — | 0.1 | 0.1 | 0.1 | 0.2 | 0.2 | 0.1 |
| TDI 65 | + | — | — | — | — | — | — | — | — | — | — | — | — | — |
| TDI 80 | — | + | + | + | + | + | + | + | — | — | — | — | — | — |
| Isocyanate S | — | — | — | — | — | — | — | — | + | — | — | — | — | — |
| Isocyanate T | — | — | — | — | — | — | — | — | — | + | — | — | — | — |
| Isocyanate U | — | — | — | — | — | — | — | — | — | — | + | — | — | — |
| Isocyanate V | — | — | — | — | — | — | — | — | — | — | — | + | + | — |
| Isocyanate W | — | — | — | — | — | — | — | — | — | — | — | — | — | + |
| Index | 50 | 50 | 50 | 50 | 50 | 50 | 50 | 50 | 50 | 50 | 50 | 50 | 50 | 50 |
| Gross density (kg/m$^3$) | 24 | 24 | 24 | 22 | 22 | 23 | 23 | 22 | 24 | 24 | 24 | 24 | 21 | 23 |
| H 70 (%) | 25.0 | 24.2 | 21.2 | 21.7 | 23.4 | 22.9 | 24.1 | 24.5 | — | — | — | — | — | — |

When the combinations of raw materials shown in the tables were reacted according to the invention, they gave rise to foams having the properties described below:

| | MDI Base | TDI Base |
|---|---|---|
| Growth density (kg/m$^3$) | 25–35 | 20–25 |
| Compression resistance 40% (kPa) | 2–4 | 1–2 |
| Tensile strength (KPa) | 80–120 | 70–100 |
| Elongation at break (%) | 80–115 | 80–110 |
| Pressure deformation residue 50% (%) | 10–40 | 4–7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a cold setting, flexible polyurethane molded foam which comprises reacting inside a closed mold at an isocyanate index below 70
   (a) a polyisocyanate comprising diphenylmethane diisocyanate and/or toluylene diisocyanate, said polyisocyanate containing up to about 25%, based on the total weight of polyisocyanate, of hexamethylene diisocyanate and/or of isophorone diisocyanate with
(b) a compound having a molecular weight of 400 to about 10,000 and containing at least two isocyanate reactive groups in the presence of
(d) about 5 to 15 parts by weight of water, based on 100 parts of component (b) and
(c) optionally a chain lengthening and/or cross-linking agent having a molecular weight of 32 to 399 and containing at least two isocyanate reactive groups.

2. The process of claim 1 wherein water (d) is used in a quantity of about 6 to 12 parts by weight, based on 100 parts by weight of component (b).

3. The process of claim 1 wherein said reaction is conducted at an isocyanate index of about 40 to 60.

4. The process of claim 2 wherein said reaction is conducted at an isocyanate index of about 40 to 60.

* * * * *